(12) United States Patent
Bulbul

(10) Patent No.: US 7,099,580 B1
(45) Date of Patent: Aug. 29, 2006

(54) METHOD AND SYSTEM FOR COMMUNICATING NETWORK TOPOLOGY IN AN OPTICAL COMMUNICATIONS NETWORK

(75) Inventor: Zeki B. Bulbul, Laurel, MD (US)

(73) Assignee: CIENA Corporation, Linthicum, MD (US)

( * ) Notice: Subject to any disclaimer, the term of this patent is extended or adjusted under 35 U.S.C. 154(b) by 1019 days.

(21) Appl. No.: 10/007,212

(22) Filed: Nov. 2, 2001

(51) Int. Cl.
*H04B 10/08* (2006.01)

(52) U.S. Cl. ............................................ 398/9; 398/58
(58) Field of Classification Search ................ 398/9, 398/57, 58
See application file for complete search history.

(56) References Cited

U.S. PATENT DOCUMENTS

| | | | | |
|---|---|---|---|---|
| 4,704,713 A | 11/1987 | Haller et al. | ................. | 398/3 |
| 4,953,156 A | 8/1990 | Olshansky et al. | ........... | 398/76 |
| 4,989,200 A | 1/1991 | Olshansky et al. | ........... | 398/76 |
| 5,016,242 A | 5/1991 | Tang | ......................... | 398/76 |
| 5,448,349 A | 9/1995 | Kosaka | ...................... | 356/73 |
| 5,524,219 A | 6/1996 | Li | ............................. | 372/16 |
| 5,530,694 A | 6/1996 | Guezou et al. | ............. | 370/223 |
| 5,548,431 A | 8/1996 | Shin et al. | ................... | 398/59 |
| 5,737,319 A | 4/1998 | Croslin et al. | .............. | 370/255 |
| 5,936,450 A | 8/1999 | Unger | ....................... | 327/237 |
| 5,963,943 A | 10/1999 | Cummins et al. | ............. | 707/10 |
| 5,978,115 A | 11/1999 | Condict et al. | ............. | 359/124 |
| 6,163,392 A | 12/2000 | Condict et al. | ............. | 359/124 |
| 6,205,122 B1 | 3/2001 | Sharon et al. | ............... | 370/254 |
| 6,243,746 B1* | 6/2001 | Sondur et al. | ............... | 709/220 |
| 2003/0058496 A1* | 3/2003 | Obeda et al. | ............... | 359/124 |

OTHER PUBLICATIONS

Wilson, Brian J. et al. "Multiwavelength Optical Networking Management and Control," Journal of Lightwave Technology, vol. 18, No. 12, Dec. 2000, pp. 2038-2057.*

* cited by examiner

*Primary Examiner*—Christine Y. Leung
(74) *Attorney, Agent, or Firm*—Merek, Blackmon & Voorhees, LLC

(57) ABSTRACT

An exemplary embodiment of the invention is a network element in an optical communications network. The network element includes a data collection application program interface (API) for collecting topology information in a first format. A transport network bridge is in communication with the data collection API. The transport network bridge receives a request for network topology information from a client. The request is in a second format different than the first format. The transport network bridge obtains the requested network topology information from the data collection API, converts the requested network topology information into the second format and provides the converted network topology information to the client. Alternate embodiments include a method for communicating topology information in an optical communications network.

20 Claims, 19 Drawing Sheets

| Byte | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Label | FS | T | I | X | X | X | X | X | X | X | X | P1 | P2 | P3 | P4 | P5 |
| Description | CRC | Level | DisId | | | Node Identifier | | | | | | | | Port Identifier | | |
| Field | F0 | F1 | F2 | | | F3 | | | | | | | | F4 | | |

FIG. 3

| | |
|---|---|
| A | 1 P C0A80003 00001 |
| B | 1 P C0A81618 00075 |
| C | 1 P C0A80003 00003 |
| D | 1 P C0A81618 00018 |

A 1 P C0A80003 00001
B 1 P C0A81618 00075
C 1 P C0A80003 00003
D 1 P C0A81618 00075

METHOD AND SYSTEM FOR COMMUNICATING NETWORK TOPOLOGY IN AN OPTICAL COMMUNICATIONS NETWORK

BACKGROUND OF THE INVENTION

1. Field of Invention

The invention relates generally to optical communications networks and in particular to a method and system for detecting network elements in an optical communications network.

2. Description of Related Art

In existing optical communications networks, network elements are provisioned to identify connections to ports on network elements. Existing networks rely on manual provisioning in which technicians perform initial provisioning and periodically update the provisioned information on a network element. The network topology may also be entered manually in a provisioning database. For a typical long haul network, this can require a labor-intensive and time-consuming entry of hundreds of fiber optic port connections. Due to the nature of a long haul network, the network elements may be physically distributed over a large geographic area. This necessitates sending technicians to these locations to verify the provisioning. Due to the human factor, the process of manually provisioning network elements and updating the provisioning database is both time-consuming and prone to entry errors. Often, the provisioning database does not accurately reflect physical network topology due to a failure to update physical changes in the provisioning database.

SUMMARY OF THE INVENTION

An exemplary embodiment of the invention is a network element in an optical communications network. The network element includes a data collection application program interface (API) for collecting topology information in a first format. A transport network bridge is in communication with the data collection API. The transport network bridge receives a request for network topology information from a client. The request is in a second format different than the first format. The transport network bridge obtains the requested network topology information from the data collection API, converts the requested network topology information into the second format and provides the converted network topology information to the client. Alternate embodiments include a method for communicating topology information in an optical communications network.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 depicts an exemplary neighbor discovery message;

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1:
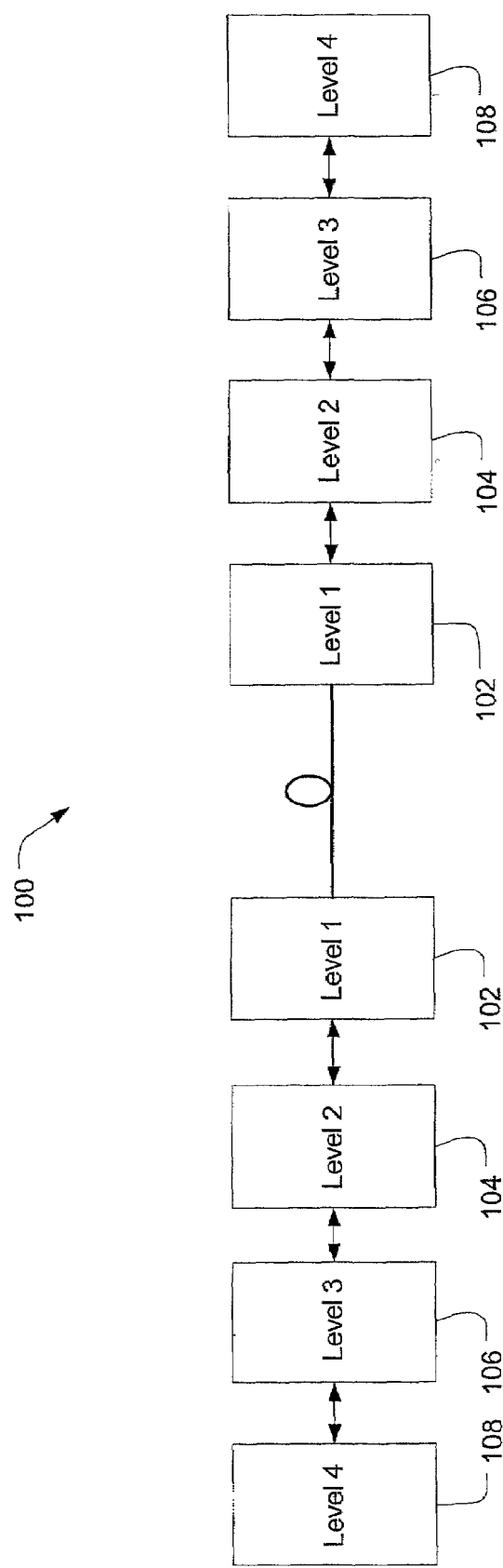
FIG. 1 is a block diagram of a portion of an exemplary optical communications network.

FIG. 1 is a block diagram of a portion of an exemplary optical communications network shown generally at 100. The network 100 includes a variety of network elements arranged in a hierarchy of levels or layers. As shown in FIG. 1, the network 100 includes level 1 network elements 102, level 2 network elements 104, level 3 network elements 106 and level 4 network elements 108. Network elements 102, 104, 106 and 108 may be a variety of devices such as routers, switches, transport devices, optical amplifiers, add/drop multiplexers, transmitters, receivers, transceivers, end terminals, etc. In an exemplary embodiment, network elements 102 provide for transport of wavelength division multiplexing (WDM) signals.

In an exemplary embodiment, the levels of network elements correspond to interface layers defined in the Synchronous Optical Network standard known as SONET. In this embodiment, level 1 network elements 102 correspond to the SONET photonic or physical layer such as CIENA Corporation's CoreStream (™) and MetroStream (™) products, level 2 network elements 104 correspond to the SONET section layer, level 3 network elements 106 correspond to the SONET line layer such as CIENA Corporation's CoreDirector (™) SONET switch and level 4 network elements 108 correspond to the SONET path layer such as CIENA Corporation's MetroDirector (™) product.

In an alternate embodiment, the levels in network 100 correspond to those defined in the Synchronous Digital Hierarchy (SDH) standard, which are similar to the SONET layers. It is understood that the network elements may be arranged in a variety of hierarchies and are not limited to the levels defined in the SONET or SDH standards.

Network element 102, 104, 106 and 108 may execute a neighbor discovery process in which the network element detects an adjacent network element at a selected hierarchy level. Each network element includes a processor that executes a neighbor discovery process in response to a computer program stored in memory. As described in detail herein, the neighbor discovery process involves an initiating network element sending a neighbor discovery message along the network requesting a response from a network element operating at or above the initiating network element's hierarchy level. A network element operating at or above the specified level responds to the neighbor discovery message with a responding neighbor discovery message identifying the responding network element to the initiating network element. In this manner, each network element detects its nearest neighbors at the specified hierarchy level. This information may then be gathered and provided to a network management system to depict the network topology as described in further detail herein.

Figure 2:
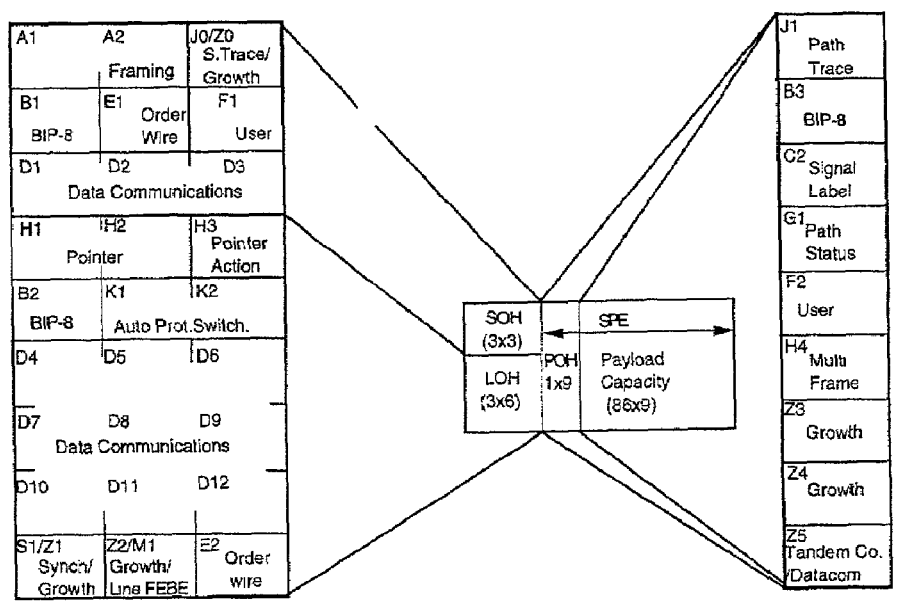
FIG. 2 depicts a conventional STS-1 frame structure.

In an exemplary embodiment of the invention, the neighbor discovery messaging is performed using a SONET overhead byte that is transmitted along with information on network 100. In an exemplary embodiment, the network transmits information using the SONET transmission standard. FIG. 2 depicts a Synchronous Transport Signal (STS) frame that forms the basic building block of SONET optical interfaces, where an STS-1 (level 1) frame is the basic signal rate of SONET. The STS-1 frame shown in FIG. 2 depicts a conventional byte allocation in the section overhead (SOH), line overhead (LOH) and path overhead (POH). The synchronous payload envelope (SPE) carries the information portion of the signal along with the POH. The various overhead bytes carry signaling and protocol information. This allows communication between intelligent nodes within the network, permitting administration, surveillance, provisioning and control of the network from a central location. The SDH standard is similar to the SONET standard and includes similar overhead bytes arranged in a synchronous transport module (STM).

In an exemplary embodiment, network elements 102, 104, 106 and 108 use the J0 byte in the SONET or SDH standard to transmit the neighbor discovery message and responding neighbor discovery message. It is understood that other overhead bytes may be used for the neighbor discovery messaging. Alternatively, the neighbor discovery messaging may be performed using direct messages without placing the messages in the overhead of an information signal.

FIG. 3 depicts an exemplary overhead byte that may be used to perform neighbor discovery messaging. The overhead byte includes sixteen bytes (0–15) divided into five fields F0–F4. The first field, F0 is a single byte that demarcates the beginning of a neighbor discovery message and includes a frame start marker and CRC-7 code, Field F1 is a single byte that indicates the hierarchy level of the neighbor discovery requested by the network element. In an exemplary embodiment, field F1 is set to zero when no neighbor discovery is being performed to prevent downstream receiving network elements from replying.

Field F1 may have a non-zero value that indicates the hierarchy level at which neighbor discovery is to occur. For example, if field F1 is assigned value 1, this indicates that the initiating network element is requesting a response from the nearest network element operating at hierarchy level one or higher. In an exemplary embodiment, a network element at a specific hierarchy level (e.g., level 1) may request a response from the nearest network element operating at or above the section level, line level or path level by assigning field F1 the value 2, 3 or 4, respectively.

Field F2 is a single byte that may be used as a distinguishing identifier to differentiate the neighbor discovery formatted J0 byte from other alternate J0 byte formats or uses. A unique identifier may be assigned to field F2 to indicate that the J0 byte is formatted for neighbor discovery.

Field F3 (bytes 3–10) contains a network element identifier corresponding to the network element transmitting the neighbor discovery message. The network element identifier may be an address based on the Internet Protocol (IP) address or any other designator.

Field F4 (bytes 11–15) contains the port identifier corresponding to the port on the network element from which the neighbor discovery message was sent. Each network element may have a number of ports. The port identifier designates one specific port on the network element. This port identifier is specific to the network element and may be designated by a five byte, hexadecimal encoded identifier ranging from 0-FFFFF thus supporting 1,048,575 ports.

Additional fields may be created to identity network elements more specifically. For example, a rack field and shelf field may be used to identify the physical location of a network element (e.g., transceiver) in a room. In this example, the rack field and shelf field identify the rack of equipment and the shelf in the rack on which the transceiver is located. Other fields may be used to specifically define the network element varying with each application.

A network element responding to an initial neighbor discovery message sends a responding neighbor discovery message. In an exemplary embodiment, the responding neighbor discovery message is provided in an overhead byte (e.g., J0) using the neighbor discovery message format shown in FIG. 3. The neighbor discovery message from the responding network element contains its hierarchy level in field F1, the network element identifier in field F3 and the port identifier in field F4.

Figure 4:
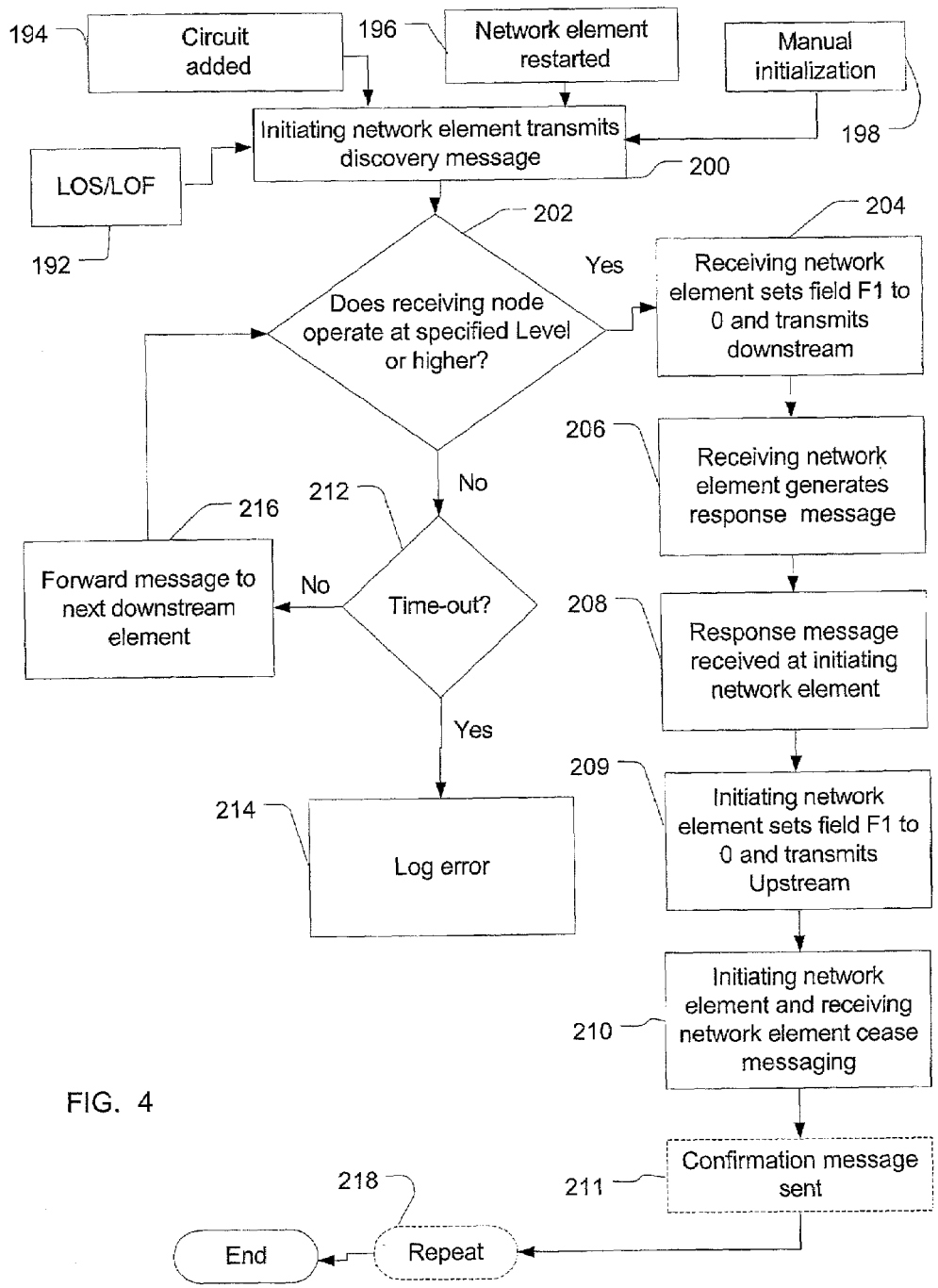
FIG. 4 is a flow chart of an exemplary neighbor discovery process.

The neighbor discovery process will now be described with reference to FIGS. 4–6. FIG. 4 is a flowchart of a neighbor discovery process performed on network 120. FIGS. 5A–5C are block diagrams of a portion of an optical network including network elements at hierarchy levels 1 and 3. The neighbor discovery process may be triggered upon certain events. For example, when a network element detects a Loss Of Signal (LOS), or a Loss Of Frame (LOF), or a circuit is added to the network, or a network element is powered down and restarted the network element may initiate the neighbor discovery process to locate its immediate network element neighbor. Alternatively, an operator may manually initiate the neighbor discovery process through a network management system. These conditions are shown in FIG. 4 at steps 192, 194, 196 and 198, respectively.

Figure 5A:
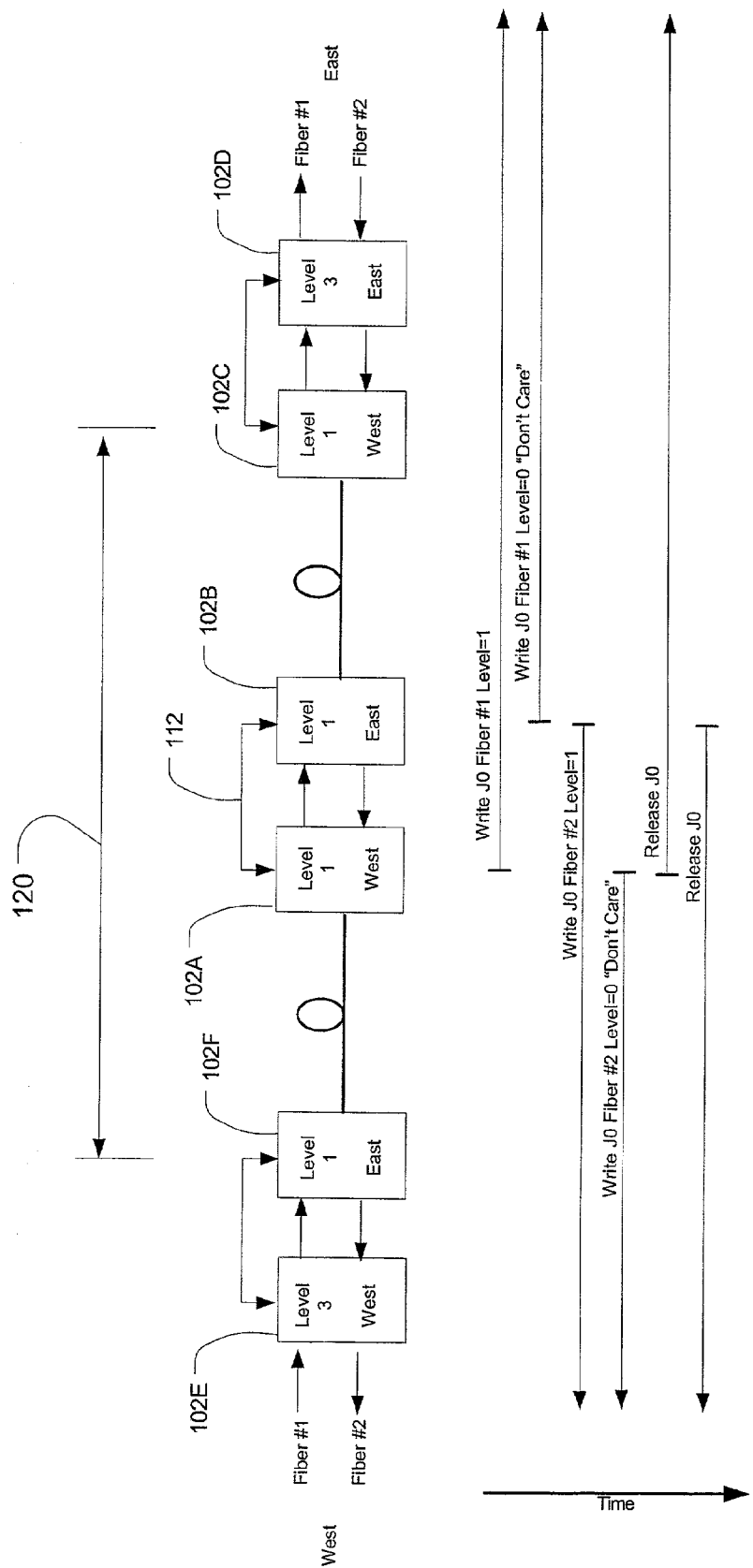
FIGS. 5A–5C are block diagrams illustrating a neighbor discovery process.

Once the neighbor discovery process is started, an initiating network element, such as 102A in FIG. 5A, generates the neighbor discovery message in overhead byte J0 on a network element port, as shown in FIG. 4, step 200. The neighbor discovery message requests a network element at a specified hierarchy level or higher to respond. As noted above, the neighbor discovery messaging may be performed in a variety of manners and is not limited to using overhead bytes.

The neighbor discovery message may be sent by a network element in either direction along network 100. These two directions are often referred to as "east" and "west". In a ring topology, the two network directions may be referred to as clockwise and counter-clockwise. It is understood that the direction of network traffic may be defined using various terminology. The term "downstream" indicates the direction of the neighbor discovery message and the term "upstream" refers to a direction opposite to the neighbor discovery message. The responding neighbor discovery message is considered to be an upstream transmission.

In an exemplary embodiment the initial neighbor discovery message is transmitted by network element 102A on fiber #1 as identified in FIG. 5A, which may be a fiber dedicated to west-east communications. The next downstream network element 102B adjacent to the initiating network element 102A receives the neighbor discovery message. As shown at step 202, the receiving network element detects the discovery message and determines whether it operates at the requested hierarchy level or higher. If so, the process flows to step 204 where the receiving network element 102B sets a "don't care" condition in the discovery message F1 field for downstream network elements. This prevents downstream network elements 120C and 102D from generating a responding neighbor discovery message.

At step 206, the receiving network element 102B generates a responding neighbor discovery message by writing the hierarchy level at which the responding network element operates in field F1, the responding network element identifier in field F3 and the responding network element port identifier in field F4 of the J0 overhead byte. This is illustrated in FIG. 5A as network element 102B writing the J0 byte and transmitting on fiber #2 (e.g., east-west fiber) upstream to network element 102A.

At step 208 the initiating network element 102A detects the responding neighbor discovery message containing the hierarchy level identifier, the network element identifier and port identifier provided by the responding network element 102B. The process flows to step 209 where the initiating network element 102A sets a "don't care" condition in the discovery message F1 field for upstream network elements. This prevents upstream network elements 120E and 102F from generating a responding neighbor discovery message. At step 210, both the initiating network element and the responding network element release the J0 byte (e.g., do not alter the content of this byte). A release indicates that the network elements are no longer altering the contents of the J0 byte rather that writing a 0 in field F1 for the don't care condition. As a result of this process, the initiating network element 102A now knows that a port is connected to an identifiable port on a neighboring network element.

If at step 202, the receiving network element does not operate at or above the hierarchy level specified in the neighbor discovery message, then flow proceeds to step 212 where the initiating network element determines if a predetermined time has elapsed (e.g., 30 seconds) without a response to the initial neighbor discovery message. If no network elements respond to the initial neighbor discovery message, then an error is logged at step 214. The error may be caused by the absence of a neighboring network element at or above the level to be detected, the presence of a neighboring network element that does not support this neighbor discovery process or a network element at a level below the detection level that corrupts the neighbor discovery message (e.g., network element writes over J0 byte). The error is logged and then may be addressed by a technician.

If at step 212 no time-out has occurred, flow proceeds to step 216 where the neighbor discovery message is passed to the next downstream network element. The process continues until either a network element responds to the initial neighbor discovery message or a time-out occurs.

Figure 5B:
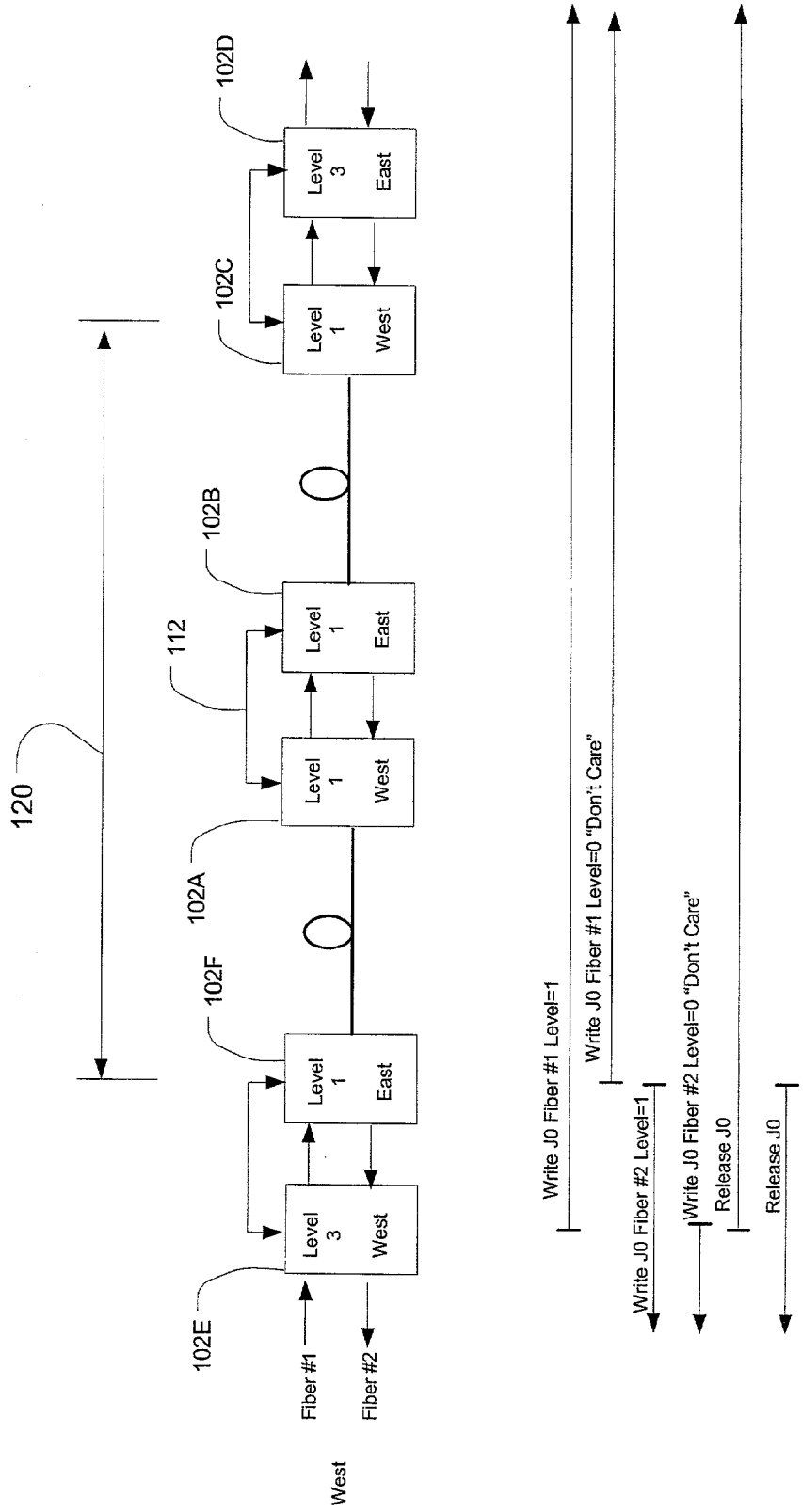
Figure 5C:
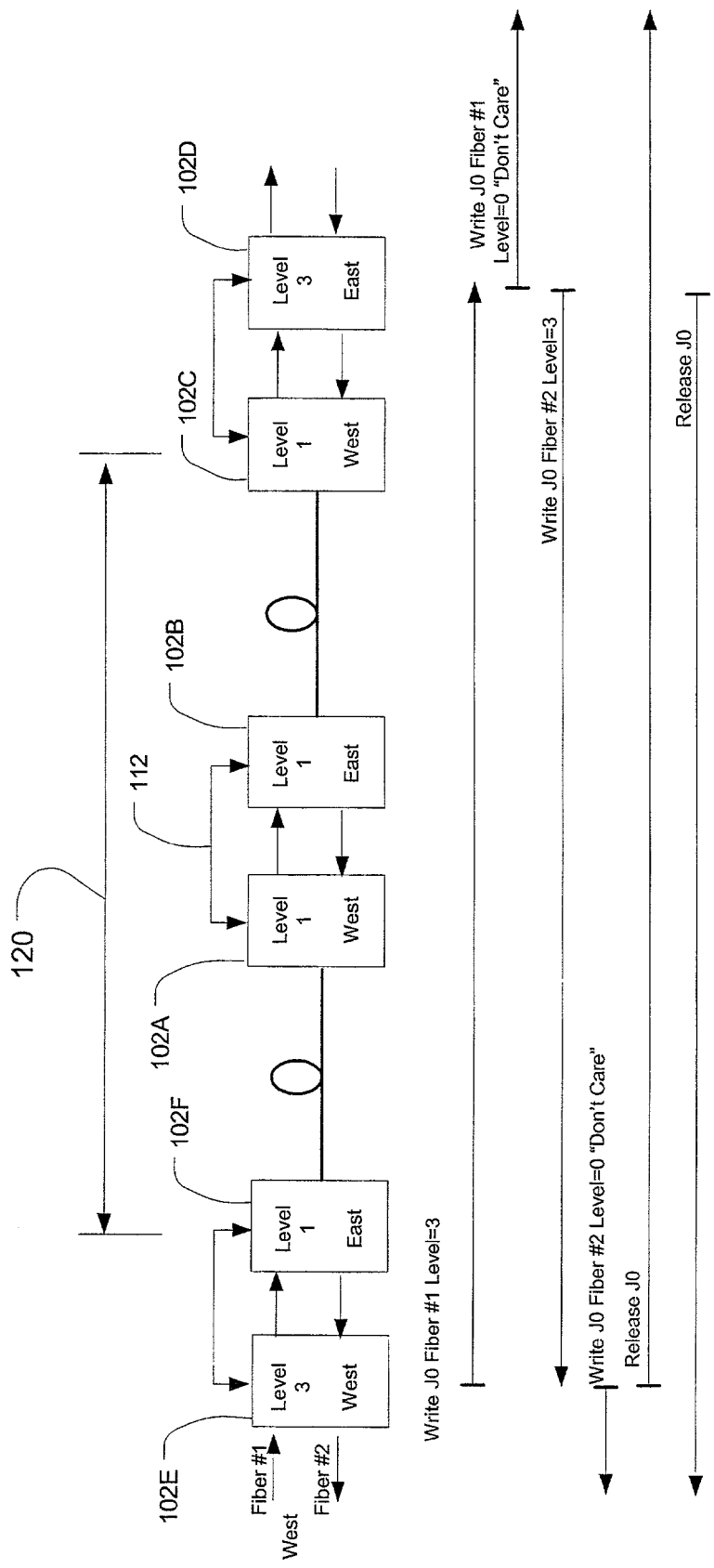

FIGS. 5B and 5C depict further examples of neighbor discovery messaging. In FIG. 5B, network element 102E operating at hierarchy level 3 generates an initial neighbor discovery message directed to network elements operating at or above level 1. Network element 102F responds to this initial neighbor discovery message as described above. In FIG. 5C, network element 102E operating at hierarchy level 3 generates an initial neighbor discovery message directed to network elements operating at or above level 3. Network element 102D responds to this initial neighbor discovery message as described above.

To confirm proper neighbor discovery, the neighbor discovery process may be performed multiple times until a predetermined number of identical responding neighbor discovery messages are received at the initiating network element. For example, the initiating network element may perform the neighbor discovery process repeatedly until 3 identical responding neighbor discovery messages are received. A limit may be imposed (e.g., 10 cycles) on the number of attempts before terminating the neighbor discovery process.

An optional confirmation message may be sent from the responding network element to the initiating network element at step 211 as described in further detail herein. To confirm results and facilitate diagnosis of errors occurring during the neighbor discovery process, an out-of-band link may be provided between network elements. For example, FIG. 5 depicts and out-of-band link 112 connecting network elements 102A and 102B. The out-of-band link 112 is a communications channel separate from the transmission path used to carry information on the network and may be implemented using a variety of mechanisms such as a direct cable, a LAN, etc. The out-of-band link may be used to determine which ports are connected between network elements when errors arise.

Figure 6:
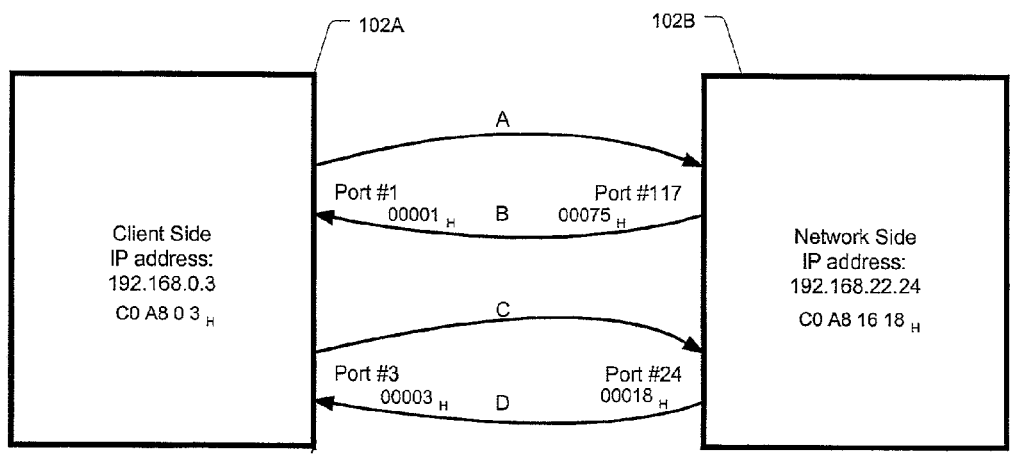
FIGS. 6–7 are block diagrams illustrating a neighbor discovery process.

FIG. 6 depicts two network elements at hierarchy level 1 performing the neighbor discovery process. Network element 102A transmits a neighbor discovery message from port 1 as shown by arrow A. FIG. 6 depicts the neighbor discovery message in which field F1 (hierarchy level) is 1, field F2 (Discovery ID) is P (e.g., arbitrary byte identifying a neighbor discovery message), field F3 (Node Identifier) is C0A80003 (the network identifier in hex format) and field F4 (Port Identifier) is 00001 (port identifier in hex format). Network element 102B receives the neighbor discovery message at port 117 and responds to the neighbor discovery message since network element 102B is a level 1 network element. Network element 102B responds with responding neighbor discovery message B as shown. Network element 102A sends another neighbor discovery message C from port 3 and receives a responding neighbor discovery message D from port 24 of network element 102B as shown.

Figure 7:
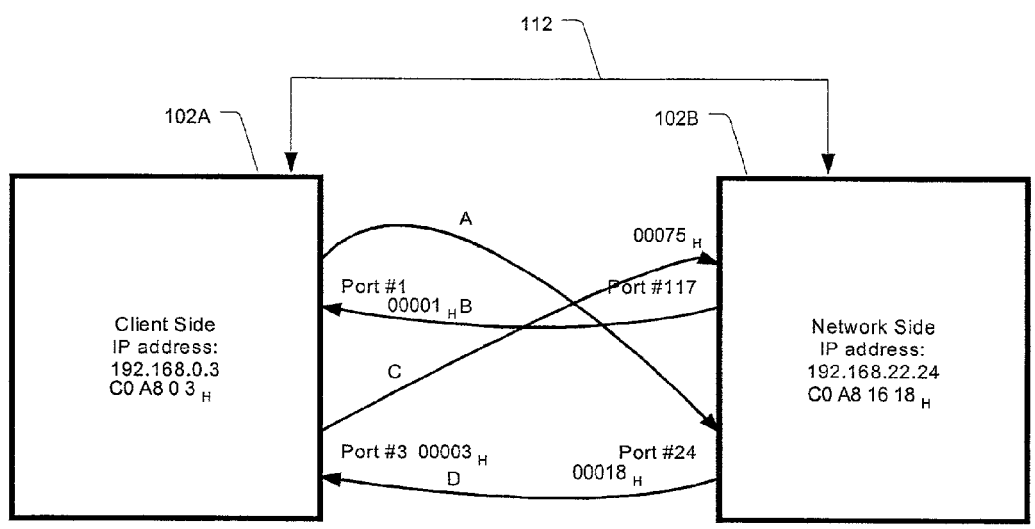

When the network element ports are connected as shown in FIG. 6, the neighbor discovery process is completed without error. FIG. 7 depicts a neighbor discovery process in which the ports are miss-wired. As shown in FIG. 7, port 1 of network element 102A is coupled to port 24 of network element 102B, which is coupled to port 3 of network element 102A, which is coupled to port 117 of network element 102B. Thus, when network element 102A generates a neighbor discovery message, it is received at port 24 of network element 102B. The responding neighbor discovery message from port 24 of network element 102b is provided to port 3 of network element 102A. Similarly, a neighbor discovery message from port 3 of network element 102A is received at port 117 of network element 102B. The responding neighbor discovery message from port 117 of network element 102B is provided to port 1 of network element 102A.

To diagnose errors and/or confirm port connections, an out-of-band link 112 may be used to transmit information between network elements 102A and 102B. In this scenario, network element 102A will either generate a time-out error due to a failure to receive a response to the neighbor discovery message or by receiving an incorrect response (e.g., port 1 receives response intended for port 3 and vice versa) depending on the timing of the neighbor discovery message from ports 1 and 3 of network element 102A.

Using the out-of-band link 112, the network elements communicate at which port a neighbor discovery message was received. For example, in FIG. 7, network element 102B can notify network element 102A that network element 102B received a neighbor discovery message A at port 24 and neighbor discovery message C at port 117. Similarly, network element 102A can notify network element 102B that responding neighbor discovery message B was received at port 1 and responding neighbor discovery message D was received at port 3. In this manner, the topology of the network can be determined despite miss-wired connections. Miss-wired connections, such as those shown in FIG. 7 are detected and a field technician can be directed to correct the physical connections that may involve re-routing the fibers or remotely controlling a digital cross connect or other switch.

This optional transmission of a confirmation message sent over out-of-band link 112 between the responding network elements to the initiating network element is depicted in step 211 of FIG. 4. The responding network element may transmit a confirmation message to the initiating network element including the neighbor discovery message, the responding network element's identifier and port identifier. The responding network element knows the identity of the initiating network element from field F3 of the initial neighbor discovery message.

The out-of-band link 112 is depicted between two network elements 102A and 102B operating at the same network hierarchy level. It is understood that an out-of-band link may be provided between network elements on different network levels. For example, an out-of-band link may be provided between a network element at the section level and a network element at the line level in the SONET standard.

The neighbor discovery process may be repeated at multiple hierarchy levels by the initiating network element or by additional network elements as shown at step 218 in FIG. 4. The neighbor discovery process may also be implemented by client equipment coupled to the transport network 120. For example, a switch communicating over transport network 120 may execute the neighbor discovery process. In this manner, network topology can be gathered from multiple systems maintained by different entities so that widespread topology can be acquired.

The neighbor discovery process described above requests a response from a network element operating at or above a specified hierarchy level. This technique is used because network elements may include functionality of lower level network elements. The neighbor discovery process may be defined such that network elements operating at the requested level (but not above the requested level) respond to the initial neighbor discovery message. Alternatively, the responding network element may format the responding neighbor discovery message to identify the responding network element's highest level of operation.

By executing the neighbor discovery process, each network element obtains information concerning port-to-port connections along the optical communications network. To provide this information to clients, this information needs to be collected. In a preferred embodiment, each network element executes a data collection unit that gathers network configuration information and provides such information to a network manager.

Figure 8:
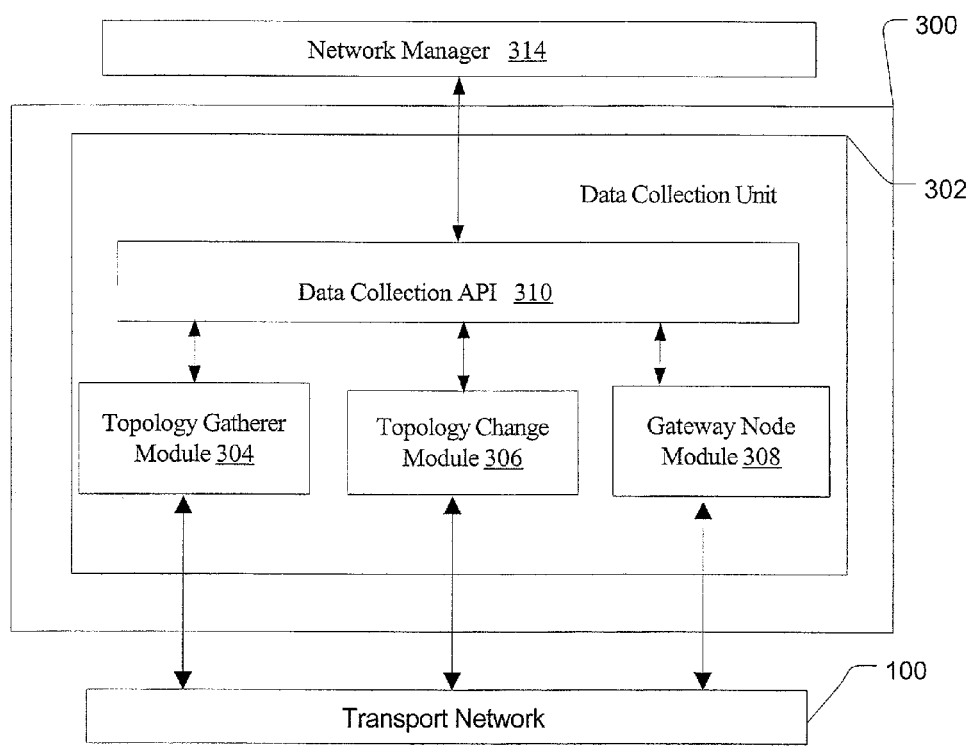
FIG. 8 is a block diagram of a network element including a data collection unit.

FIG. 8 is a block diagram of a network element 300 including a data collection unit 302. The data collection unit 302 may be implemented by a processor executing a computer program stored in memory accessible by the network element 300. The network element 300 may be any device in the optical communications network such as a router, switch, transport device, optical amplifier, add/drop multiplexer, transmitter, receiver, transceiver, etc.

Figure 9:
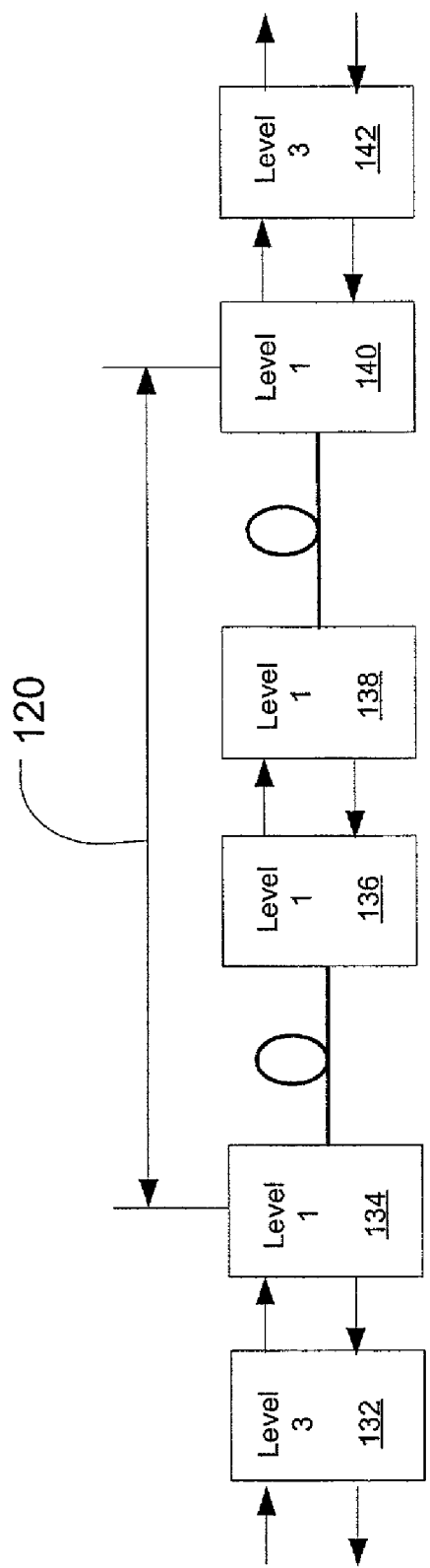
FIG. 9 is a block diagram of a portion of a communications network.

The data collection unit 302 allows network elements to detect network topology across an entire channel from the origination point to the termination point on the transport network 120, shown in FIG. 9. The neighbor discovery process described above detects the nearest neighbors at or above a specified hierarchy level, but does not detect network elements across the entire network. The neighbor discovery process will allow network elements in span 120 to detect nearest neighbors operating at or above a specific hierarchy level. For example, network element 132 can detect network element 134 (nearest neighbor at level 1) and 142 (nearest neighbor at level 3). The data collection unit 302 operates to facilitate detection of network topology across the transport network 120.

The data collection unit 302 includes three modules. A topology gatherer module 304 detects network elements along a channel across the network. A topology change module 306 detects changes in the network configuration. A gateway node module 308 detects the addition and deletion of gateway nodes on the network. Gateway nodes are defined as either the channel origination or termination points on the network. Each module may be implemented by one or more processors in the network element 300 executing computer programs.

The topology gatherer module 304, topology change module 306, and gateway node module 308 communicate with a data collection Application Program Interface (API) 310. The data collection API 310 may be implemented by a processor in network element 300 executing a computer program. The data collection API 310 interfaces with modules 304, 306 and 308 to retrieve the transport network topology data. Exemplary topology data includes a list of gateway nodes where channels originate or terminate on the transport network 120, end-to-end connectivity for a channel on the transport network 120, connectivity to client equipment at the edge of the transport network 120 and a channel trail identifying the connections for a channel through the transport network 120.

In addition, the data collection API 310 generates topology notifications when the topology change module 306 detects topology changes. Such topology changes include a channel being added or deleted on the transport network 120, a channel becoming incomplete or stale on the transport network 120, client equipment being attached or removed at the edge of the transport network 120 and a gateway node being added or deleted on the transport network 120.

The function of the data collection API 310 will be described herein. The data collection API 310 communicates topology data and topology notifications to clients either upon request from a client or automatically. Clients requesting information from the data collection unit 302 may be the network manager 314 or client equipment coupled to the transport network 120. The data collection API 310 processes requests from clients for information concerning network topology and gathers the topology and connection information for each request. The network element 300 may include a bridge that communicates with clients in a particular protocol (e.g., TL1) as described herein.

Operation of the modules in the data collection unit 302 will now be described. The topology gatherer module 304 gathers three types of topology data. A first type of topology data is a channel connection trail that specifies the channel connections through network elements in the transport network 120. A channel is a single traffic bearing entity on the transport network. The channel connection trail provides the network element name, network element address (e.g., an IP address), network element type, network element port identifier and port type for each network element along a channel.

Figure 10:
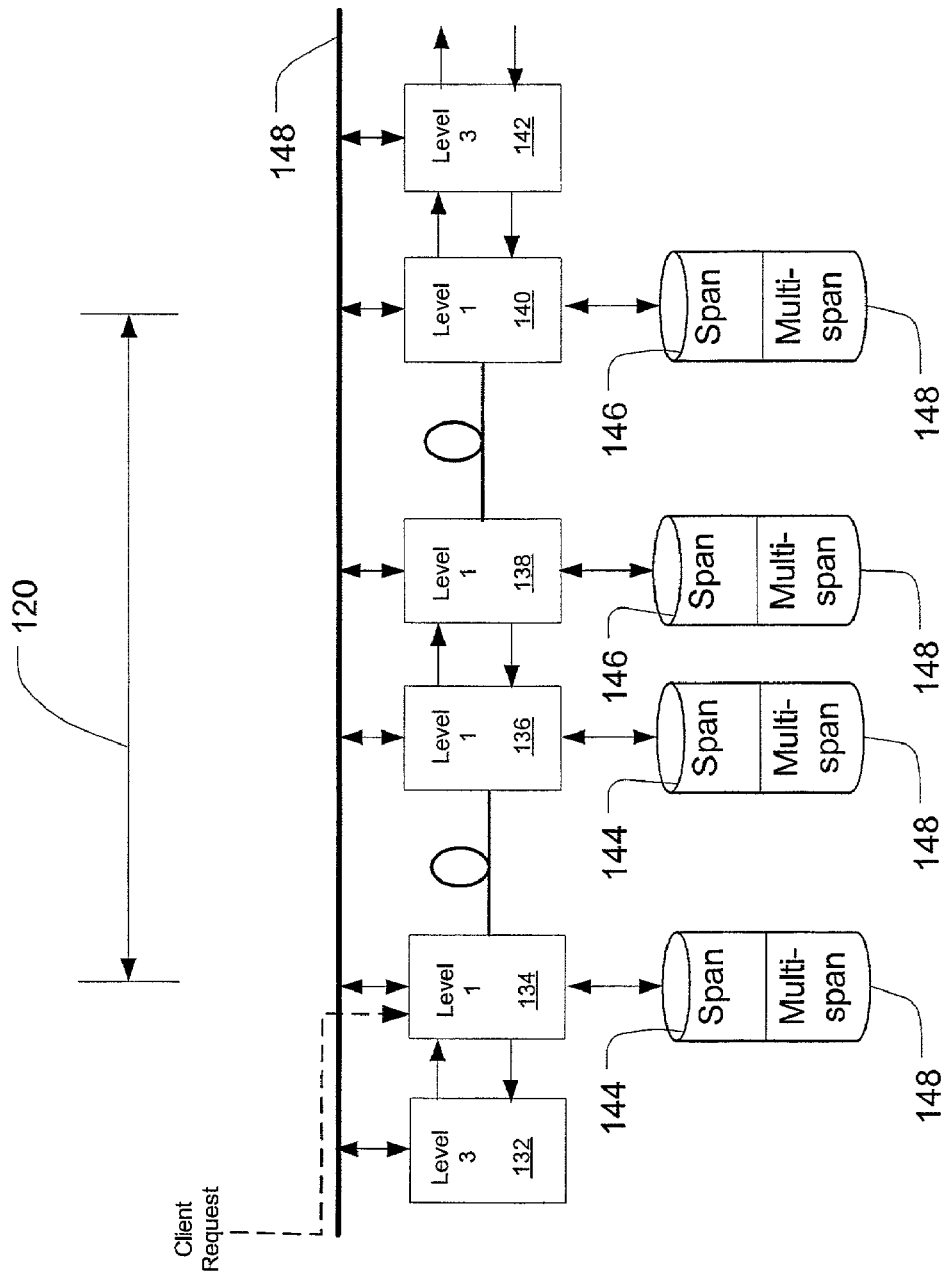
FIG. 10 is a block diagram of a portion of a communications network.

The acquisition of the channel connection trail data may be initiated by a client system coupled to the transport network 120 as shown in FIG. 10. The network depicted in FIG. 10 shows back-to-back WDM spans in the transport network 120. The transport network contains two spans made up of level 1 network elements. A request from a client may be received at an end terminal, network element 134 on the transport network 120. The request is received at data collection API 310 on network element 134 that instructs topology gatherer module 304 to initiate acquisition of channel connection trail data.

Figure 11:
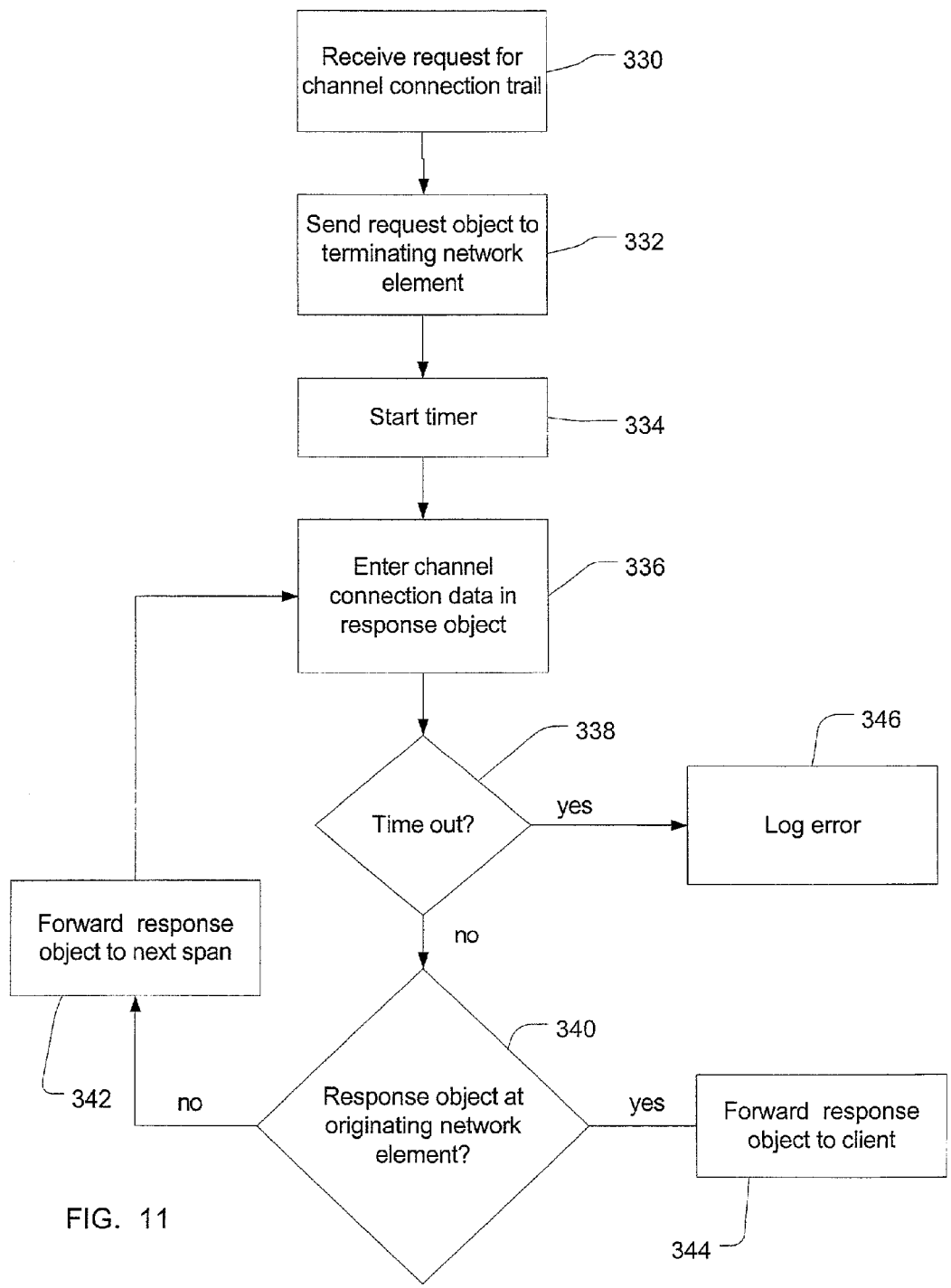
FIG. 11 is a flowchart of an exemplary process for detecting network topology.

FIG. 11 is a flowchart of a process for developing the channel connection trail data. The process begins at step 330 where a request for channel connection trail data is received from a client. The request for channel connection trail data may be directed to multiple channels in which case the connection trail data is gathered for multiple channels simultaneously. At step 332 a request object is created and forwarded to the terminating network element of the channel on the transport network. In the example shown in FIG. 10, the request object is forwarded to the transport terminating network element 140.

Communication between network elements on the transport network 120 and between a network element and a client external to transport network 120 may be performed over a network 148 such as an overlay IP network. Such networks are conventionally used to allow network elements to communicate without utilizing the resources of the transport network 120. The overlay IP network may serve as the out-of-band link 112 discussed above with reference to FIG. 5. Alternatively, the out-of-band link 112 and the overlay IP network may be separate communications paths.

At step 334, a timer is started with a value (e.g., seconds) corresponding to the time necessary to traverse the spans of network elements between the originating network element 134 and the terminating network element 140. The timer is used subsequently to detect a time-out condition indicating an error in collecting the channel connection data. The number of span traversals between the originating network element 134 and the terminating network element 140 is stored in a multispan database 148. The number of span traversals may be obtained using known protocols such as those disclosed in U.S. Pat. No. 6,163,392, the entire contents of which are incorporated herein by reference.

When the request object is received at the terminating network element 140, it creates a response object and enters the channel connection data in the response object as shown at step 336. In the example shown in FIG. 10, network element 140 writes the channel connection trail data in the response object. The channel connection data includes the network element name, network element address (e.g., an IP address), network element type, network element port identifier and port type for each network element along the path of the channel on the transport network 120. In certain scenarios, a channel may be defined by multiple sets of channel connection trail data. For example, if a channel is dropped and continued through a network element such as an add/drop multiplexer, the channel is considered to have multiple endpoints (one at the drop point and one at the terminating network element). The channel connection data would define two endpoints for the channel and two channel connection trails are defined.

Each network element in a WDM span includes a span database that contains topology data for that particular WDM span. For example, as shown in FIG. 10, each network element includes a span database represented as elements 144 and 146. The span database is populated through existing techniques and the databases within a WDM span are synchronized so that updates at one network element are written to the span database associated with each network element in the relevant WDM span. Accordingly, the span database 144 for network elements 134 and 136 will have similar contents. Span database 146 for network elements 138 and 140 will have similar contents. A multispan database 148 is used to collect other types of topology data across back-to-back spans on the transport network 120 described in further detail herein.

Once the terminating network element has entered the channel connection data in the response object, flow proceeds to step 338 where it is determined if a time-out has occurred. As described with reference to step 334, a timer is initiated when the response object is forwarded to the terminating network element. If the timer expires before the response object is provided to the client, then an error is logged at step 346 and the client requesting the channel connection data is notified.

If no time-out is detected at step 338, flow proceeds to step 340 where it is determined whether the response object is at the originating network element. In the example, shown in FIG. 10, step 340 determines if the response object is at originating network element 134. If so, the response object is provided to the client as shown at step 344. If not, flow proceeds to step 342 where the response object is forwarded to the peer node for that channel on the upstream span. A peer node is a network element on a neighboring span that regenerates one or more channels. In the example shown in FIG. 10, network elements 136 and 138 are peer nodes. The peer node for the channel is detected during the neighbor discovery process. Steps 336, 338, 340 and 342 are continued until either a time-out condition occurs or the response object is provided to the client.

Typically, the client requesting the response object will update a network topology database with the information provided in the response object. For example, network manager 314 will update a network topology database and may provide a graphical depiction of the network topology to a user. If the client is a technician diagnosing the transport network 120, the channel connection data in the response object may be used to diagnose network errors.

If the topology of the channel changes while the request object is being completed, a topology change notification may be used to update the response object provided to the client. Alternatively, a time-out condition may occur due to the inability to update the response object. In the event of a time-out error, the client requesting the channel connection data is notified and may submit a new request.

Another type of topology data that may be acquired by topology gatherer module 304 is a channel end-to-end connection data. The channel end-to-end connection data specifies the endpoints for a channel on the network. In operation, a network element receives a request at data collection API 310 for end-to-end connection data for a channel. At the originating node and terminating node of a channel, a multispan object is contained in a multispan database 148. The multispan object includes end-to-end connection data for a channel such as network element name, network element address (e.g., IP address), port identifier, port type and frequency of the channel for the originating network element and terminating network at each end of the channel. If the channel is dropped by a drop-and-continue network element, then multiple termination points may be recorded for the channel as described above. The multispan objects are synchronized, for example over network 120, so that updates at the channel originating network element are written in the multispan database associated with the channel terminating network element.

Another type of topology data that may be acquired by topology gatherer module 304 is client-mapping data. Network elements may be coupled to client equipment (referred to as clients) communicating over the transport network 120. In the example shown in FIG. 10, originating network element 134 and terminating network element 140 are commonly coupled to clients utilizing the transport network 120.

Client mapping data for both the originating network element 134 and terminating network element 140 are written in multispan database 148. The client mapping data includes information that is detected during the neighbor discovery process. The client mapping data includes the client address (e.g., IP address), the client port, and the client node name for each channel. The originating network element 134 communicates with a client coupled to the originating network element and obtains the client mapping data for each channel coupled to that client. It is understood that different channels may be coupled to different client equipment. Thus, the client mapping data is channel specific. The terminating network element 140 obtains similar client mapping data from clients coupled to terminating network element 140. As noted above, multispan databases 148 are synchronized to contain similar contents.

The topology change module 306 detects topology changes based upon changes to the entries in the multispan database 148. The topology change module 306 detects changes in the network topology whenever a new or updated multispan data object is generated. One exemplary change detected by the topology change module 306 is the addition of a channel. A channel is added when attributes within the multispan database 148 specify that both endpoints of a channel have been configured. The channels may be configured through manual provisioning or through the neighbor discovery process. This indicates that both the originating network element 134 and the terminating network element 140 have created entries in the multispan database 148 corresponding to the channel.

Figure 14:
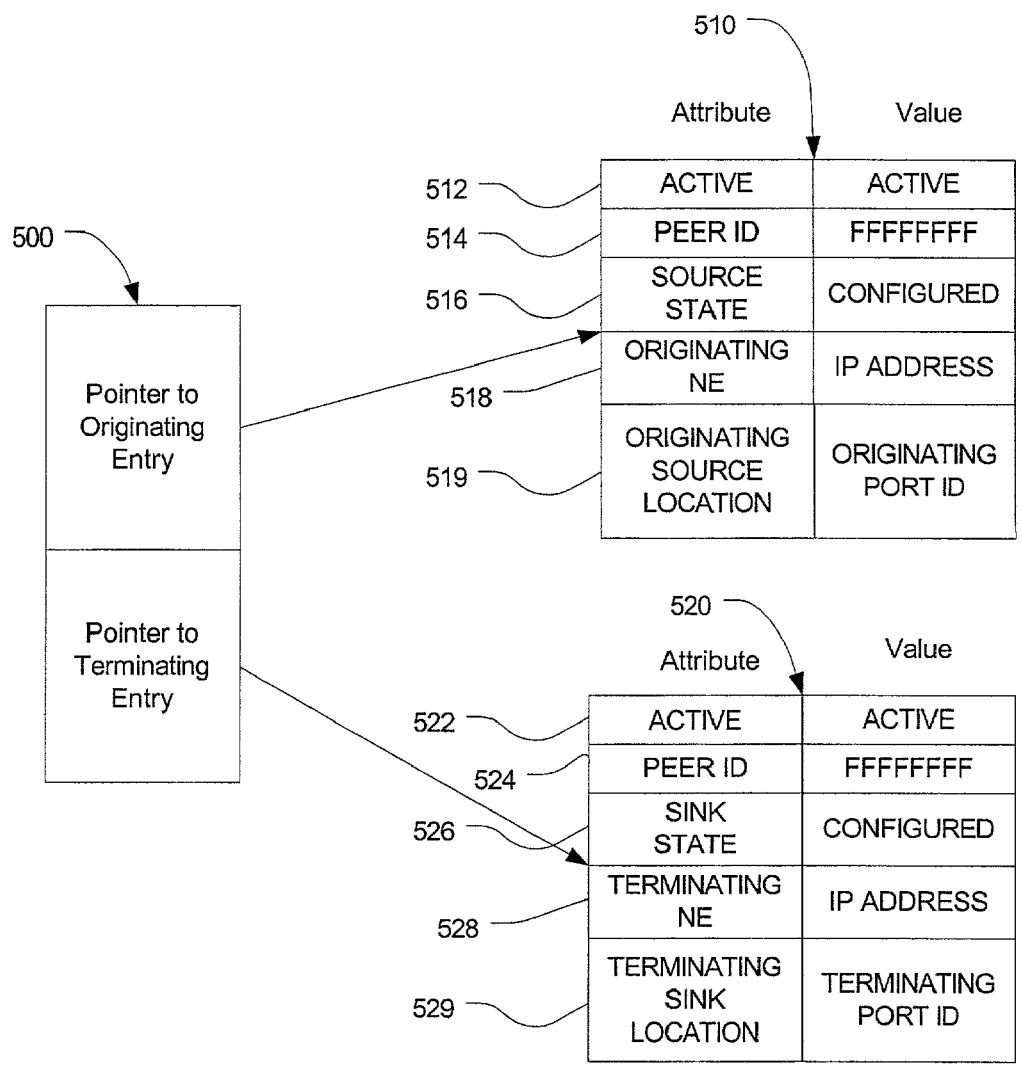
FIG. 14 depicts an exemplary multispan database entry when a channel is added.

FIG. 14 depicts an exemplary channel entry 500 in multispan database 148. The channel entry 500 includes a pointer to an originating entry 510 and a terminating entry 520. Originating entry 510 includes attributes of the channel at the originating network element (e.g., network element 134 in FIG. 10). The attributes are arranged in fields and values including an active status field 512 indicating whether the channel is active at the originating network element. A peer ID field 514 identifies a peer network element in a span adjacent to the span including the originating network. A state field 516 indicates the status of the channel at the originating network element. An originating network element identifier field 518 provides an address (e.g., IP address) for the originating network element. An originating source location field 519 identifies the port on the originating network element. Similar fields 522–529 are provided for the terminating network element 140 in FIG. 10.

As noted above, FIG. 14 illustrates entries in the multispan database 148 indicating that a channel is active. Fields for both the originating entry 510 and the terminating entry 520 indicate that the channel is active and both network elements have configured the channel.

Figure 15:
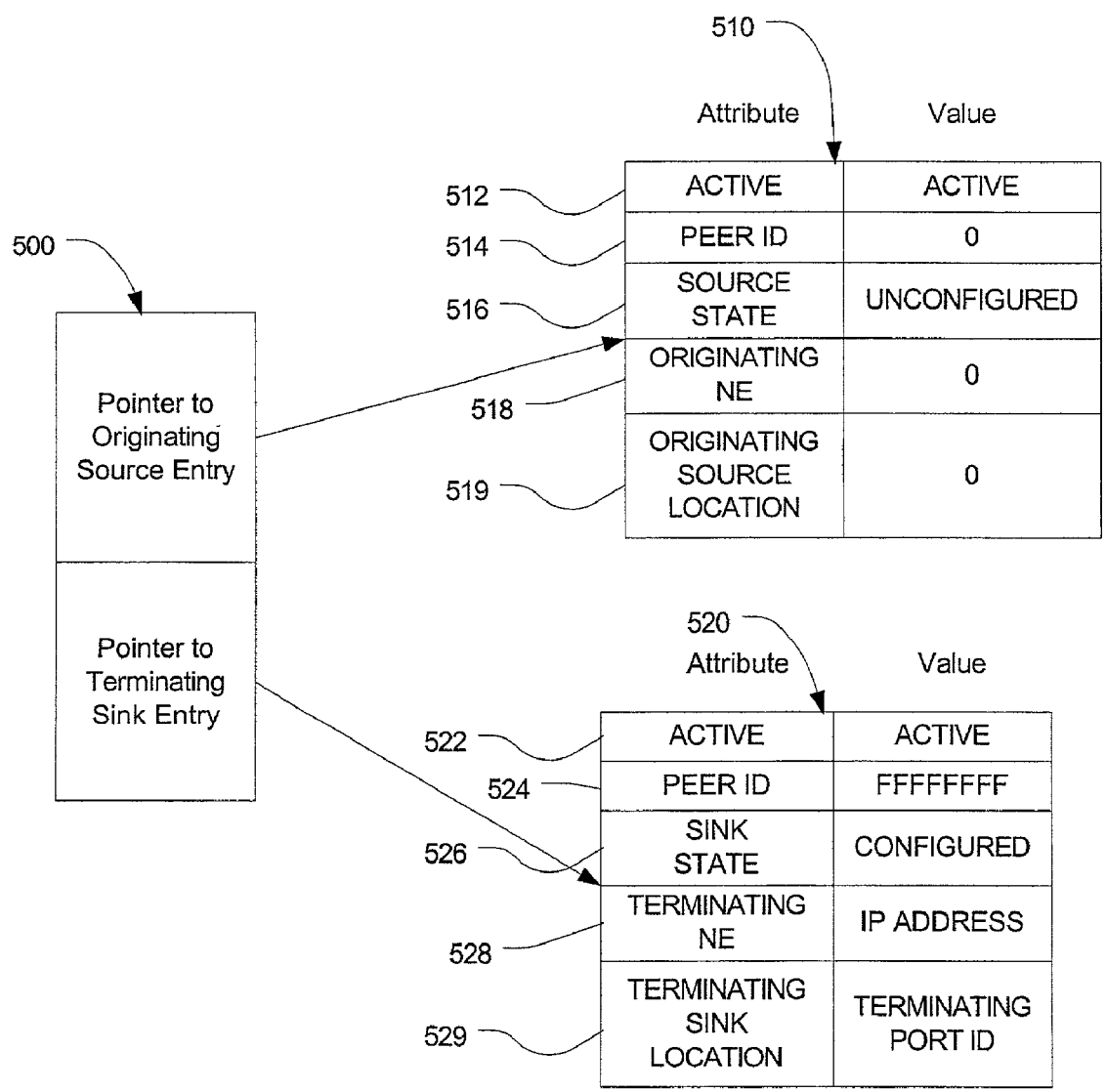
FIG. 15 depicts an exemplary multispan database entry when a channel is incomplete.

Another exemplary change detected by topology change module 306 is an incomplete channel. A channel is considered incomplete when the content of the multispan database indicates that only one of the originating node 134 and the terminating node 140 are configured for the channel. FIG. 15 depicts exemplary multispan database entries when a channel is incomplete. As shown in FIG. 15, the terminating entry 520 indicates that the terminating network element has configured the channel. By contrast, the originating entry 510 indicates that originating network element has not configured the channel as represented by state field 516 having a value of "unconfigured."

Figure 16:
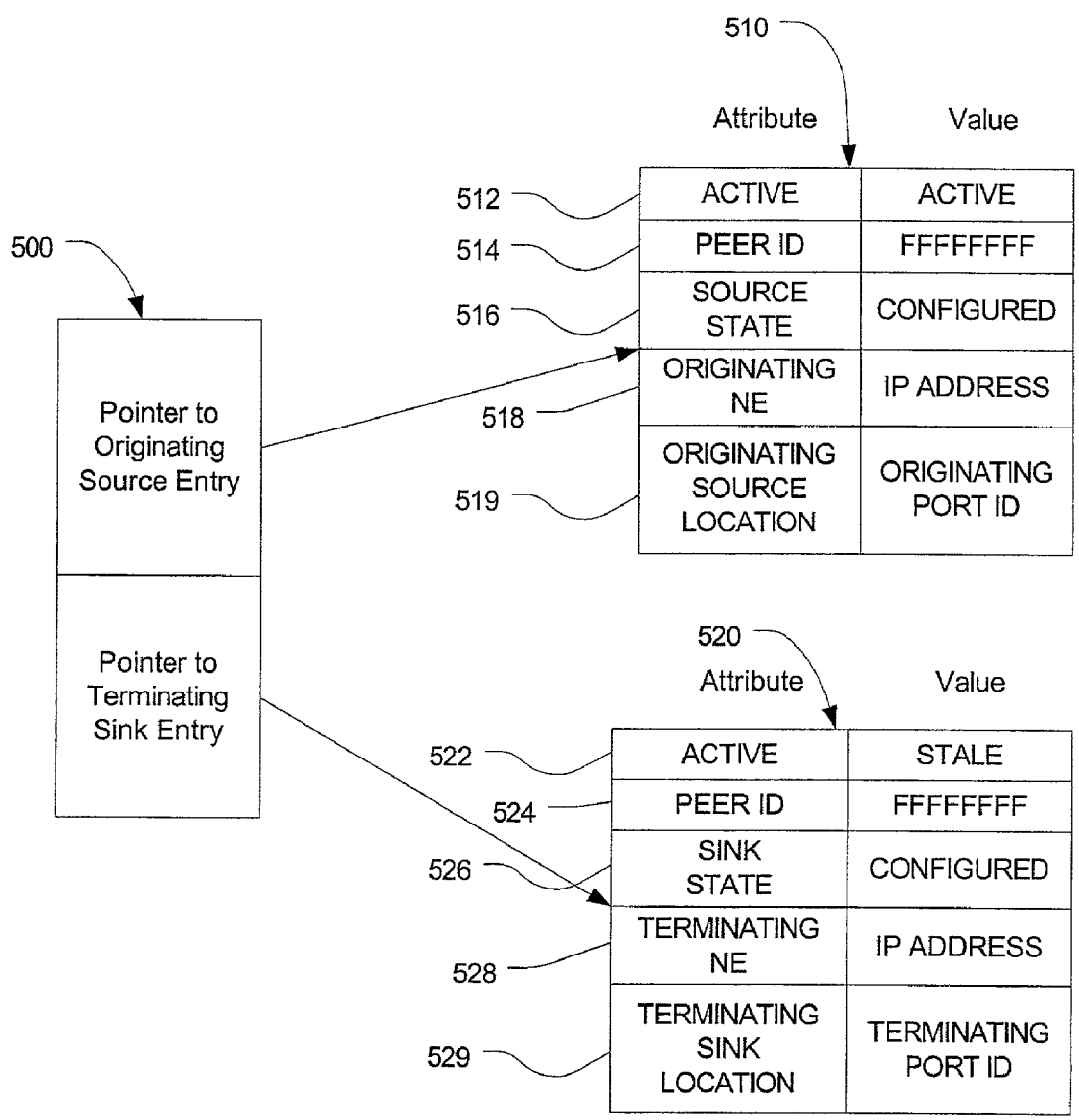
FIG. 16 depicts an exemplary multispan database entry when a channel is stale; and, FIG. 17 depicts an exemplary multispan database entry when a channel is deleted.

Another exemplary change detected by topology change module 306 is a stale channel. A channel is considered stale if the entries for that channel in the multispan database 148 for the originating network element and terminating network element are no longer synchronized due to a loss of communication between two nodes along the channel path. For example, if the originating network element 134 considers the terminating sink frequency to be 180 THz and the sink's frequency at the terminating network element has changed to 194 THz, then this channel would be considered stale. FIG. 16 depicts exemplary multispan database entries when a channel is stale. As shown in FIG. 16, the terminating entry 520 indicates that the channel is stale through active field 522 having a value "stale." Such a state may occur if communications cease between peer network elements 136 and 138.

Figure 17:
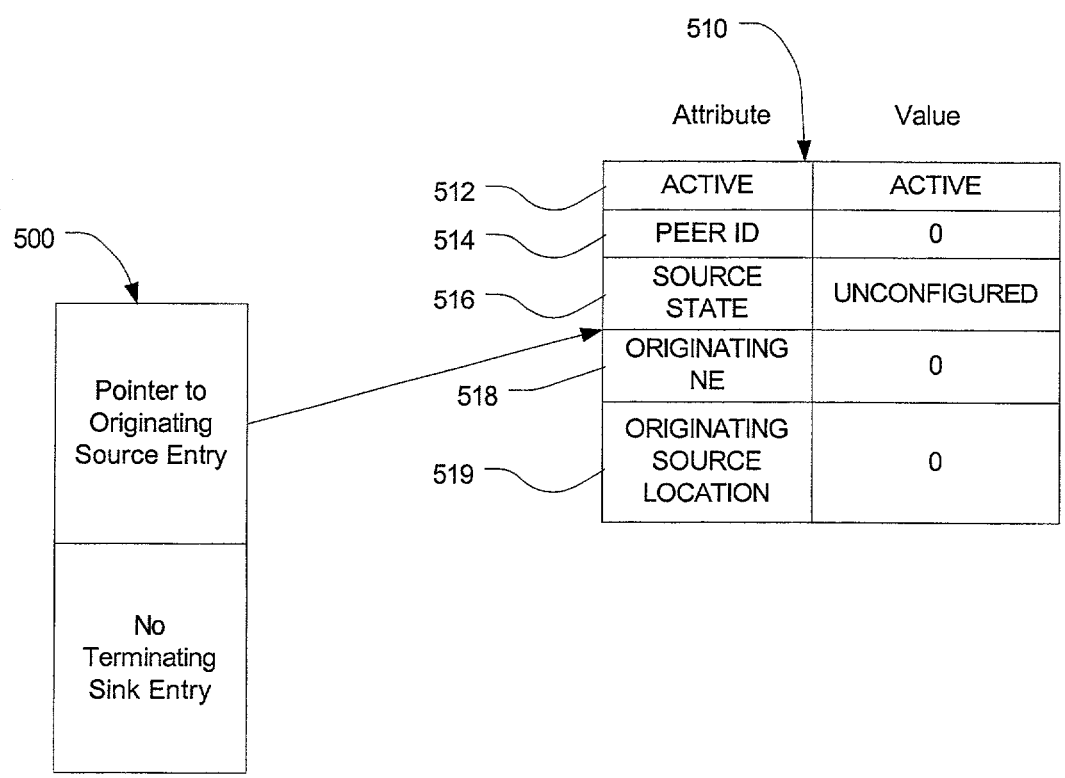

Another exemplary change detected by topology change module 306 is a deleted channel. A channel is considered deleted when the topology change module 306 determines that entries in the multispan database associated with both originating network element and the terminating network element indicate that the channel no longer exists on the transport network. FIG. 17 depicts exemplary multispan database entries when a channel is deleted. As shown in FIG. 17, the originating entry 510 indicates that the channel is unconfigured through state field 516 having a value "unconfigured." There is no corresponding terminating entry.

If the topology change module 306 detects a change in the status of any channel, an autonomous notification is generated. The autonomous notification is provided to clients through the data collection API 310.

Gateway node module 308 generates a gateway node object when the network element is configured as a gateway (e.g., an originating or terminating point for a channel). For example, referring to FIG. 10, gateway module 308 will generate a gateway node object when a channel originates on network element 134. The gateway node object is a data structure that is broadcast along the transport network to the network elements. The gateway node object identifies a channel and the network element (network element address, network element port, etc.) where the channel originates or terminates. As the gateway node object is transferred from network element to network element, a hop count is generated. The hop count identifies the number of network elements traversed by the gateway node object from the originating network element. For example, referring to FIG. 10, if network element 134 generates the gateway node object, the gateway node object is broadcast to network element 136. At network element 136, the hop count is increased by one (to represent one network element traversed) and the gateway node object may be stored in a multispan database associated with the network element 136.

The gateway node object is broadcast to the remaining network elements increasing the hop count as each network element receives the gateway object. The gateway node object identifies the origination point and/or the termination point for a channel and the distance to the gateway network element in terms of number of network elements. If a gateway node object is received that corresponds to a gateway node object already stored in the multispan database, the gateway node object having the smaller hop count (e.g., corresponding to the closer gateway network element) is stored in the multispan database. The gateway node object may be broadcast periodically (e.g., every minute) so that the multispan databases maintain the current status of the location of the nearest gateway network element.

The data collection API 310 collects topology data from each module and stores this topology data in a data structure with a generic format including entries identifying network topology. The data structure, however, cannot be directly interpreted using existing messaging protocols.

Figure 12:
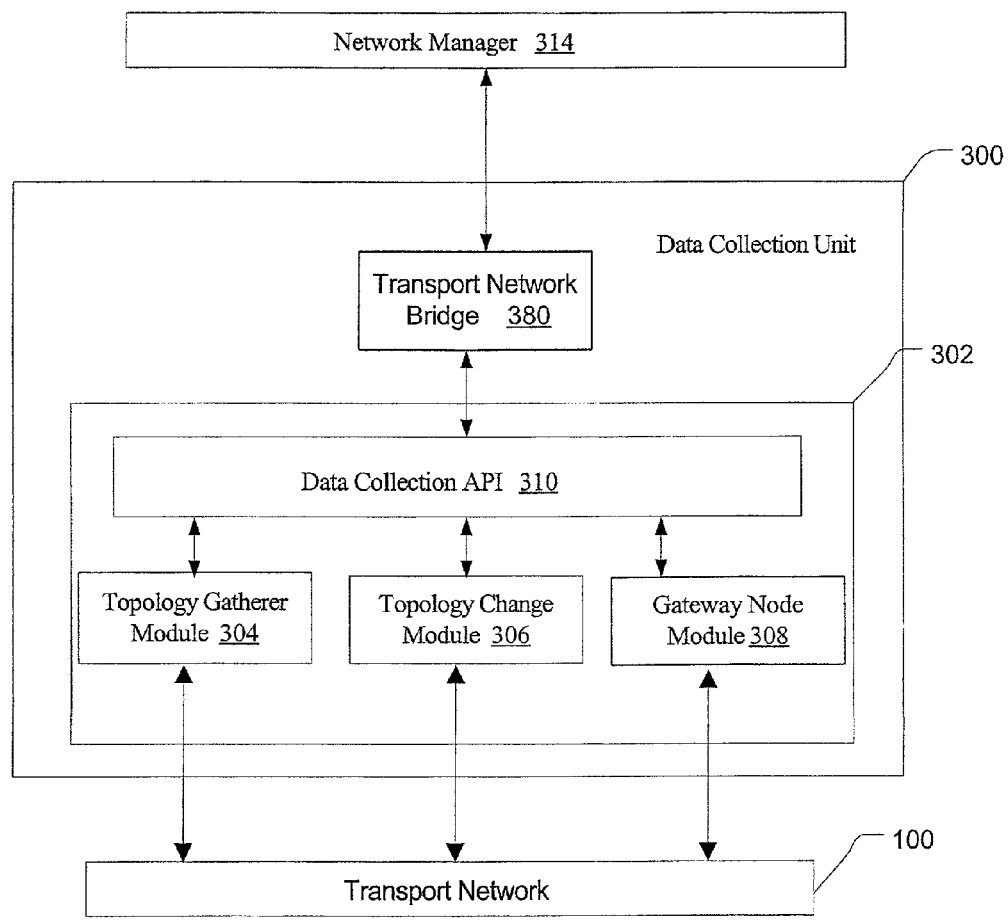
FIG. 12 is a block diagram of a network element including a data collection unit.

To facilitate providing the network topology to clients, the network element 300 may include a transport network bridge 380 as shown in FIG. 12. The transport network bridge 380 may be implemented by a processor executing a computer program stored in memory accessible by the network element 300. The transport network bridge 380 converts the topology data in the generic format into a format that is recognizable by a client. Accordingly, the transport network bridge 380 serves as a communication bridge between clients (such as network manager 314) and data collection unit 302.

Figure 13:
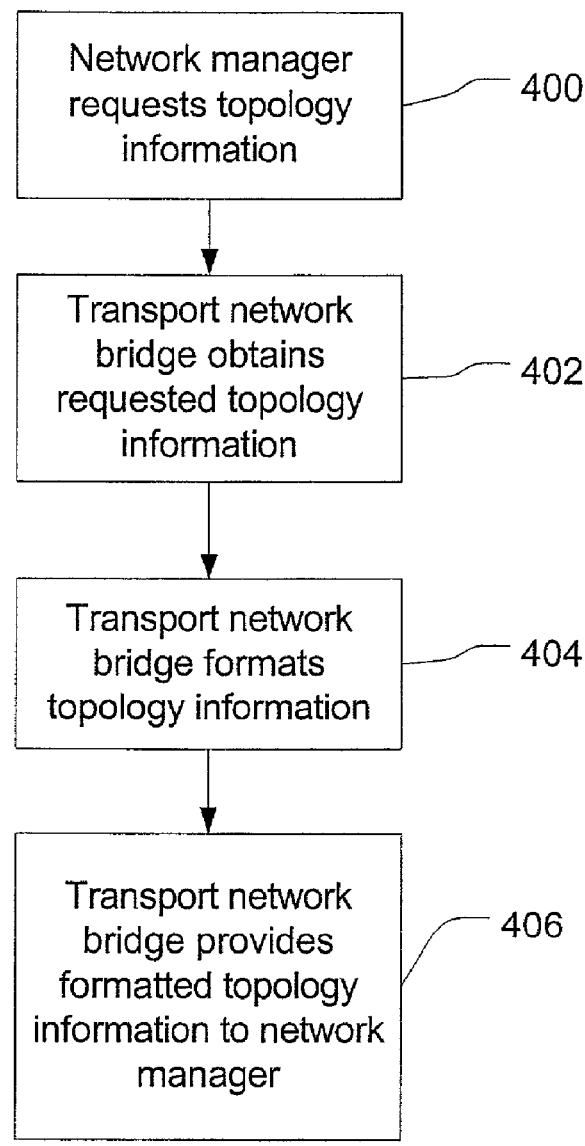
FIG. 13 is a flowchart of an exemplary process of obtaining and formatting topology information.

FIG. 13 is a flowchart of a process implemented between the network manager 314 and the transport network bridge 380. The process begins at step 400 where the network manager 314 requests topology information. The network manager 314 may issue requests using a predetermined communications protocol such as Transaction Language 1 (TL1). As noted above, the network manager 314 may communicate with the network elements 300 over a network such as an IP network. In this example, the TL1 requests are transmitted using TCP/IP protocol.

At step 402, the transport network bridge 380 receives the request from the network manager 314 and retrieves the requested topology information from the data collection API 310. Various types of topology information may be requested by the network manager 314. Exemplary requests for retrieval of specific types of topology information are described in further detail below.

At step 404, the transport network bridge 380 converts the topology information retrieved from the data collection API 310 into a predetermined communications protocol. As noted above, the topology information stored by the data collection API 310 is a generically formatted data structure. The transport network bridge 380 converts the retrieved topology information into a communications protocol interpretable by network manager 314. In an embodiment of the invention, the retrieved topology information is placed in TL1 format.

At step 406, the reformatted topology information is provided from the transport network bridge 380 to the network manager 314. Again, if the transport network bridge 380 and network manager 314 communicate via a network, the TL1 formatted topology information is transmitted using the network protocols (e.g., TCP/IP). The transport network bridge 380 may communicate using different communications protocols such as TL1, simple network management protocol (SNMP), common management interface protocol (CMIP), etc.

The transport network bridge 380 may be used to communicate with devices other than the network manager 314. For example, the transport network bridge 380 may provide network topology to devices such as client equipment coupled to the transport network. Multiple transport network bridges may be used, each configured for communications under different protocols so that a variety of devices may retrieve topology information from the data collection unit 302.

The transport network bridge 380 may receive a variety of requests from devices such as network manager 314. A number of topology requests are used to instruct the transport network bridge 380 to retrieve certain types of topology information. An exemplary topology request is a gateway node request. The gateway node request is a request for the transport network bridge 380 to retrieve topology information that identifies the gateway nodes on the transport network 120. As noted above, a gateway node is a network element where a channel originates or terminates. As described above, gateway node module 308 detects gateway nodes along the transport network 120. The identity of gateway nodes is provided to the data collection API 310 and stored. The gateway node request includes a network element identifier that directs the gateway node request to a specific network element.

In response to the gateway node request, the transport network bridge 380 in the specified network element accesses the data collection API 310 and obtains a list of gateway nodes including network element identifiers such as a network element's IP address and any associated network element name (if assigned). This list of gateway nodes is then formatted into the proper protocol (e.g., TL1) and provided to the requester.

Another exemplary topology request is the end-to-end channel request for the transport network bridge 380 to retrieve topology information identifying channels originating or terminating at a specified network element. The end-to-end channel request includes a network element identifier that directs the end-to-end channel request to a specific network element. As described above, topology gatherer module 304 detects channel end-to-end connection data along the transport network 120. The channel end-to-end connection data is provided to the data collection API 310 and stored.

In response to the end-to-end channel request, the transport network bridge 380 operating in the specified network element accesses the data collection API 310 and obtains a list of channels originating or terminating at the network element specified in the end-to-end channel request. For each channel in the list of originating or terminating channels, the channel information is provided including channel status, a time stamp when the channel status was updated, channel data rate, channel name, access identifier, channel direction, frequency, IP address for network element originating/terminating the channel and target identifier for the network element originating/terminating the channel. For channels that are dropped and continued (e.g., through an add/drop multiplexer) multiple groups of channel termination data may be provided to identify subsequent termination points for the channel. This list of channels and associated channel information is then formatted by transport network bridge 380 into the proper protocol (e.g., TL1) and provided to the requestor.

The end-to-end channel request described above requests data for all channels originating or terminating at a specified network element. The end-to-end channel request may be further limited to a specific channel rather than all channels. In this scenario, the end-to-end channel request includes a channel identifier indicating that the end-to-end channel request is limited to a specified channel.

Another exemplary topology request is a channel trail request for the transport network bridge 380 to retrieve topology information identifying a channel path including origination point, termination point and intermediate network elements. The channel trail request includes a network element identifier that directs the request to a specific network element. The channel trail request may also include a channel identifier indicating that the channel trail request is directed to a single channel. As described above, topology gatherer module 304 detects a channel connection trail data along the transport network 120. The channel connection trail data is provided to the data collection API 310 and stored.

In response to the channel trail request, the transport network bridge 380 operating in the specified network element accesses the data collection API 310 and obtains the channel connection trail data. For each channel, the channel connection trail data is gathered including information such as channel status, an access identifier for the point where the channel originates, channel direction, target identifier of the network element where the channel originates, IP address for the network element where the channel originates and type of network element where the channel originates. Similar channel connection trail data may be provided for each network element that the channel traverses, up to and including the terminating network element where the channel ends. This list of channels and associated channel connection trail data is then formatted by transport network bridge 380 into the proper protocol (e.g., TL1) and provided to the requestor.

Another exemplary topology request is a channel-client mapping request for the transport network bridge 380 to retrieve topology information identifying channels at a specified network element coupled to client equipment. The client equipment is considered network equipment not forming part of the transport network 120. The channel mapping request includes a network element identifier that directs the channel-client mapping request to a specific network element. As described above, topology gatherer module 304 detects client mapping data along the transport network 120. The client mapping data is provided to the data collection API 310 and stored.

In response to the channel-client mapping request, the transport network bridge 380 operating in the specified network element accesses the data collection API 310 and obtains a list of channels either originating or terminating at the specified network element and coupled to an external client. For each channel in the originating or terminating channel list, channel information is provided including information such as channel status, access identifier for the network element, channel direction, name of the network element, IP address of the network element, access identifier of the client, name of the client, port identifier of the client and IP address of the client. This list of channels and associated channel information is then formatted by transport network bridge 380 into the proper protocol (e.g., TL1) and provided to the requestor.

The channel-client mapping request described above requests channel data for all channels originating or terminating at a specified network element and coupled to client equipment. The channel-client mapping request may be further limited to a specific channel rather than all channels. In this scenario, the channel-client mapping request includes a channel identifier indicating that the channel-client mapping request is limited to a specified channel.

The transport network bridge 380 may also forward autonomous notifications from the API 310 to clients such as the network manager 314. As described above, the API 310 receives topology change information from topology change module 306. This topology change information is provided to clients through the data collection API 310. The transport network bridge 380 provides the topology change information to clients that communicate in a predefined protocol (e.g., TL1).

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A network element in an optical communications network, the network element comprising:
   a data collection application program interface (API) collecting topology information, said topology information being in a first format; and,
   a transport network bridge in communication with the data collection API, the transport network bridge receiving a request for network topology information from a client, the request being in a second format different than the first format,
   said transport network bridge obtaining the requested network topology information from said data collection API;
   said transport network bridge converting the requested network topology information into the second format to define converted network topology information;
   said transport network bridge providing the converted network topology information to the client.

2. The network element of claim 1 wherein the second format is Transaction Language 1 (TL1).

3. The network element of claim 1 wherein the client is a network manager.

4. The network element of claim 1 wherein the request for network topology information is a gateway node request for information identifying network elements where a channel originates or terminates on the optical communications network.

5. The network element of claim 1 wherein the request for network topology information is an end-to-end channel request for information identifying a channel originating or terminating at a specified network element.

6. The network element of claim 5 wherein the end-to-end channel request is directed to a single channel.

7. The network element of claim 1 wherein the request for network topology information is a channel trail request for information identifying channel connections along the optical communications network.

8. The network element of claim 7 wherein the channel trail request is directed to a single channel.

9. The network element of claim 1 wherein the request for network topology information is channel-client mapping request for information identifying channel connections to client equipment.

10. The network element of claim 9 wherein the channel-client mapping request is directed to a single channel.

11. A method for communicating topology information in an optical communications network, the method comprising:
collecting topology information at a data collection Application Program Interface (API), the topology information being in a first format;
receiving a request from a client at a transport network bridge for network topology information, the request being in a second format different than the first format,
the transport network bridge obtaining the requested network topology information from said data collection API;
the transport network bridge converting the requested network topology information into the second format to define converted network topology information; and,
the transport network bridge providing the converted network topology information to the client.

12. The method of claim 11 wherein the second format is transaction language 1 (TL1).

13. The method of claim 11 wherein the client is a network manager.

14. The method of claim 11 wherein the request for network topology information is a gateway node request for information identifying network elements where a channel originates or terminates on the optical communications network.

15. The method of claim 11 wherein the request for network topology information is an end-to-end channel request for information identifying a channel originating or terminating at a specified network element.

16. The method of claim 15 wherein the end-to-end channel request is directed to a single channel.

17. The method of claim 11 wherein the request for network topology information is channel trail request for information identifying channel connections along the optical communications network.

18. The method of claim 17 wherein the channel trail request is directed to a single channel.

19. The method of claim 11 wherein the request for network topology information is channel-client mapping request for information identifying channel connections to client equipment.

20. The method of claim 19 wherein the channel-client mapping request is directed to a single channel.

* * * * *

UNITED STATES PATENT AND TRADEMARK OFFICE
CERTIFICATE OF CORRECTION

PATENT NO. : 7,099,580 B1  
APPLICATION NO. : 10/007212  
DATED : August 29, 2006  
INVENTOR(S) : Bulbul Page 1 of 1

It is certified that error appears in the above-identified patent and that said Letters Patent is hereby corrected as shown below:

Column 5, line 41 "JO" should be -- J0 --

Column 5, line 55 "JO" should be -- J0 --

Column 5, line 58 "JO" should be -- J0 --

Column 6, line 8 "JO" should be -- J0 --

Signed and Sealed this

Twenty-first Day of November, 2006

JON W. DUDAS  
*Director of the United States Patent and Trademark Office*